(12) United States Patent
Nicola et al.

(10) Patent No.: US 7,534,018 B2
(45) Date of Patent: May 19, 2009

(54) ILLUMINATED VISOR VANITY

(75) Inventors: Kirk M. Nicola, Beverly Hills, MI (US); Joel D. Carpenter, Richland, MI (US); James J. Hobson, Hanover, MI (US)

(73) Assignee: International Automotive Components North America, Inc., Dearborn, MI (US)

( * ) Notice: Subject to any disclaimer, the term of this patent is extended or adjusted under 35 U.S.C. 154(b) by 0 days.

(21) Appl. No.: 11/686,978

(22) Filed: Mar. 16, 2007

(65) Prior Publication Data

US 2008/0225515 A1 Sep. 18, 2008

(51) Int. Cl.
*B60Q 3/02* (2006.01)
(52) U.S. Cl. .................. 362/492; 362/137; 362/800
(58) Field of Classification Search ............. 362/492, 362/137, 136
See application file for complete search history.

(56) References Cited

U.S. PATENT DOCUMENTS

| | | | |
|---|---|---|---|
| 2,268,189 A | 12/1941 | Colbert | |
| 3,375,364 A | 3/1968 | Marcus | |
| 3,908,119 A | 9/1975 | Zeytoonian | |
| 4,364,597 A * | 12/1982 | Viertel et al. | 296/97.5 |
| 4,624,499 A | 11/1986 | Flowerday | |
| 4,639,085 A | 1/1987 | Marcus et al. | |
| 4,648,011 A | 3/1987 | Boote et al. | |
| 4,710,856 A | 12/1987 | Cheung | |
| 4,734,831 A | 3/1988 | Keyser et al. | |
| 4,751,618 A | 6/1988 | Iacovelli | |
| 4,760,503 A | 7/1988 | VandenBerge et al. | |
| 4,764,852 A | 8/1988 | Sakuma | |
| 4,791,537 A | 12/1988 | Fisher et al. | |
| 4,807,093 A | 2/1989 | Cisler | |
| 4,809,140 A | 2/1989 | Jonsas | |
| 4,847,737 A | 7/1989 | VanOrder et al. | |
| 4,912,607 A | 3/1990 | Kocsi et al. | |
| 4,922,391 A | 5/1990 | Dykstra | |
| 4,926,295 A | 5/1990 | Tamuraya | |
| 4,979,079 A | 12/1990 | Tawaraya | |
| 4,984,137 A | 1/1991 | Maemura | |
| 5,014,169 A | 5/1991 | Chetwynd | |
| 5,054,839 A | 10/1991 | White et al. | |
| 5,061,003 A | 10/1991 | Gabas | |
| 5,067,764 A | 11/1991 | Lanser et al. | |
| 5,076,634 A * | 12/1991 | Muller et al. | 296/97.5 |
| 5,160,203 A | 11/1992 | Viertel et al. | |
| 5,188,446 A | 2/1993 | Miller | |
| 5,192,110 A | 3/1993 | Mykytiuk et al. | |
| 5,197,777 A | 3/1993 | Lanser et al. | |

(Continued)

FOREIGN PATENT DOCUMENTS

JP 8230463 9/1996

*Primary Examiner*—Jong-Suk (James) Lee
*Assistant Examiner*—Leah S Lovell
(74) *Attorney, Agent, or Firm*—Brooks Kushman P.C.

(57) ABSTRACT

A visor vanity for use in a vehicle includes a vanity mirror, a light source for providing illumination to the user of the mirror or for other purposes, an energy source independent of the vehicle's electrical system for energizing the light source, a switch for causing light source to be energized by the independent power source or de-energized, and a timer for de-energizing the light source after a certain time period has passed so as to minimize depletion of the independent energy source. The light source may comprise one or more LEDs.

18 Claims, 4 Drawing Sheets

U.S. PATENT DOCUMENTS

| | | | |
|---|---|---|---|
| 5,203,623 A | 4/1993 | Viertel et al. | |
| 5,205,639 A | 4/1993 | White et al. | |
| 5,207,501 A * | 5/1993 | Sakuma et al. | 362/137 |
| 5,274,532 A | 12/1993 | Gabas | |
| 5,301,994 A | 4/1994 | Wilson | |
| 5,331,525 A | 7/1994 | Lawassani et al. | |
| 5,428,513 A | 6/1995 | Hiemstra et al. | |
| 5,431,473 A | 7/1995 | Hiemstra | |
| 5,438,491 A | 8/1995 | White | |
| 5,441,325 A | 8/1995 | Toth et al. | |
| 5,475,573 A | 12/1995 | White | |
| 5,498,053 A | 3/1996 | Gebauer et al. | |
| 5,498,056 A | 3/1996 | Viertel et al. | |
| 5,564,813 A * | 10/1996 | Curtindale | 362/492 |
| 5,577,791 A | 11/1996 | Viertel et al. | |
| RE35,622 E | 10/1997 | Wilson | |
| 5,727,837 A | 3/1998 | Viertel | |
| 5,741,040 A | 4/1998 | Gebauer et al. | |
| 5,906,424 A | 5/1999 | Peterson | |
| 6,076,947 A * | 6/2000 | Miller | 362/492 |
| 6,135,610 A | 10/2000 | Beck et al. | |
| 6,203,161 B1 | 3/2001 | Busch et al. | |
| 6,325,527 B1 | 12/2001 | Lee | |
| 6,435,593 B2 | 8/2002 | Welter | |
| 6,499,868 B1 | 12/2002 | Kerul, Jr. | |
| 6,692,060 B1 | 2/2004 | Wilson | |
| 7,032,949 B1 | 4/2006 | Wang et al. | |
| 2001/0024370 A1 * | 9/2001 | Macher et al. | 362/492 |
| 2005/0237756 A1 | 10/2005 | Ogawa | |
| 2006/0098446 A1 | 5/2006 | Barker et al. | |

* cited by examiner

ILLUMINATED VISOR VANITY

BACKGROUND OF THE INVENTION

1. Field of the Invention

The present invention relates generally to vehicle sun visors having a vanity mirror and a light source for providing illumination to the user of the visor.

2. Background Art

Vehicles, such as automobiles and trucks, commonly employ sun visors. Such visors typically include a vanity mirror and a light source for providing illumination to the user of the vanity mirror. The light source is typically energized by the vehicle's electrical system. In so doing, electrical conduit (wiring) is required to be run from the electrical system of the vehicle to such vanity light source. Such electrical conduits are typically run through the support arm of the visor.

An energy source independent from the vehicle electrical system, such as a battery, can be located within the visor vanity itself for energizing the light source. (see, e.g., U.S. Pat. No. 6,499,868) This eliminates the labor and material costs required in running electrical conduit (wiring) between the vehicle's electrical system and the visor. However, this arrangement has several drawbacks. First, the light sources typically used, such as incandescent bulbs, consume an amount of energy that makes using in independent power source such a batteries impractical. In such circumstances, the batteries would have a relatively short life before they would need to be replaced. Second, if the vanity light source is accidentally left on, the independent power source such as a battery will be depleted and will again have to be replaced.

SUMMARY OF THE INVENTION

Accordingly, it is an object that the visor vanity of the present invention overcomes the above-described problems.

More specifically, it is an object of the invention to provide a visor body where the visor body includes a vanity mirror, a light source, an energy source independent of the electrical system of the vehicle for energizing the light source, a switch for causing the light source to be energized by the energy source, and a timer for causing the light source to be de-energized after a period of time has passed.

It is a further object of the invention to include a mirror cover for covering or uncovering the vanity mirror. In such case, movement of the mirror cover into the uncovering position may cause the switch to energize the light source. Moreover, movement of the mirror cover into the covering position may cause the switch to discontinue energizing the light source. The mirror cover may be a sliding cover or a hinged cover.

In another object of the invention, the switch may be a plunger switch. The switch may discontinue to energize the light source after a predetermined amount of time has passed.

In yet another object of the invention, the energy source may be at least one battery. The energy source may be accessible such that it may be removed and replaced when necessary. For example, the visor body may include a removable lens overlying the light source and the energy source such that the energy source may be accessed and replaced by removing the removable lens. Or the visor body may includes a removable lens overlying the light source and the energy source such that the light source and energy source may be accessed and replaced by removing the removable lens.

In yet another object of the invention, the light source may be an LED. The energy source may be at least one battery.

In yet another object of the invention, the visor vanity comprises a visor body including a vanity mirror, a light source, a battery energy source independent of the electrical system of the vehicle for energizing the light source, a switch for causing the light source to be energized by the energy source, a timer for causing the light source to be de-energized after a period of time has passed, and a mirror cover for covering or uncovering the vanity mirror and cooperating with the switch such that movement of the mirror cover into the uncovering position causes the switch to energize the light source and movement of the mirror cover into the covering position causes the switch to discontinue energizing the light source.

Again, in yet another object of the invention, the light source may be an LED. The battery energy source may be accessible such that it may be removed and replaced when necessary. The visor body may include a removable lens overlying the light source and the battery energy source such that the battery energy source may be accessed and replaced by removing the removable lens.

In yet another object of the invention, the visor vanity comprises a visor body having a vanity mirror/light assembly. The vanity mirror/light assembly includes a bezel, a vanity mirror having a reflective surface, the vanity mirror being mounted to the bezel such that the reflective surface may be used by a user of the visor vanity, a light source mounted to the bezel, a battery energy source mounted to the bezel for energizing the light source, such battery energy source being independent of the electrical system of the vehicle, a switch mounted to the bezel for allowing or disallowing the energy source to energize the light source, and a timer mounted to the bezel for de-energizing the light source after a certain period of time has passed.

In yet another object of the invention, The visor vanity may include a mirror cover mounted to the bezel for covering or uncovering the vanity mirror, wherein movement of the mirror cover into the uncovering position causes the switch to energize the light source.

DETAILED DESCRIPTION OF THE PREFERRED EMBODIMENT(S)

Figure 1:
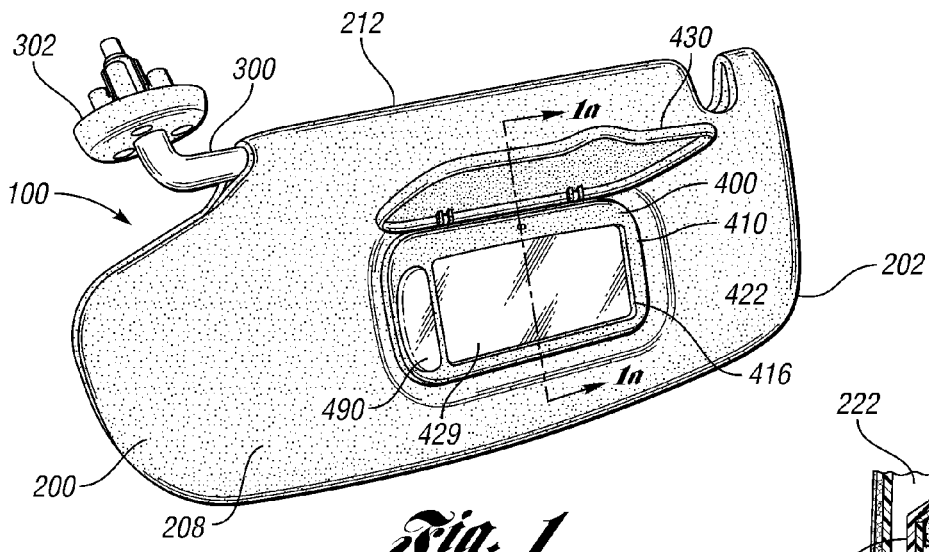
FIG. 1 is a perspective view of a visor assembly in accordance with a first embodiment of the invention.

Referring to FIG. 1, a visor assembly 100 includes a visor 200 and a visor arm 300 having a visor bracket 302 of a conventional design.

The visor arm 300 is typically mounted to the visor bracket 302 which in turn may be mounted to any suitable mounting surface, such as the sheet metal of the vehicle roof (not shown). The visor arm 300 is typically pivotally connected to the visor bracket 302 such that the visor arm 300 together with the visor 200 may be moved into desired positions. For example, the visor arm 300 may typically be pivoted at the visor bracket 302 such that the visor 200 may be moved into positions such as adjacent to the front or side windows of a vehicle. Such brackets and pivotal connections are well known in the art and will not be described in further detail here.

The visor 200 is preferably mounted to the visor arm 300 via a torque control such that the visor 200 may be rotated relative to the visor arm 300. Such a torque control is preferably mounted within the visor 200 for aesthetic reasons. Any suitable type of torque control or other mechanism can be used that allows the visor 200 to be moved between, and held in, various rotational positions with respect to the visor arm 300. This allows the visor 200 to be moved between a lowered substantially vertical position or to a raised position which is substantially horizontal or higher. Such torque control arrangements are well known in the prior art and will not be described in further detail here.

As shown in FIGS. 1-4, in the visor embodiments shown, the visor 200 includes a visor body 202 and a vanity mirror light assembly 400. The vanity mirror light assembly 400 includes a vanity bezel 410, a cover 430 hingeably connected to the vanity bezel 410, a light source assembly 440, a switch 450, a timer 460, an energy source 470, and a circuit board 480.

The visor body 202 may be substantially solid or hollow and may include a substrate formed from plastic, foam, press board, or any other desired material. Any suitable visor body configuration or construction may be used with this invention. The visor body 202 in this particular embodiment is formed of a one-piece clamshell construction having a front body portion 204 and a rear body portion 206. The exterior surface 208 of the front body portion 204 and rear body portion 206 may be covered by a suitable covering 210, such as fabric, cloth, vinyl, leather, or any other suitable material or combination of materials. The front body portion 204 and rear body portion 206 may be connected by a live hinge 212 along one side.

The visor body 202 may also include a fastening mechanism such as body snaps to assist in the assembly of such a visor body 202 having a clamshell construction. Such body snaps may be of any suitable configuration such as the locking pin and socket snaps disclosed in U.S. Pat. No. 5,054,839 issued on Oct. 8, 1991 to White et al. Such snaps may have sockets or female snap receptors 216 situated at appropriate locations along the interior surface 218 of the rear body portion 206 and locking pins or male snap protrusions 220 situated at appropriate locations along the interior surface 218 of the front body portion 204 such that the male snap protrusions 220 are adjacent to, and will engage and lock into the female snap receptors 216 when the clam shell visor body 202 is closed. The interlocking of the female snap receptors 216 and male snap protrusions 220 will not only maintain such a clam shell visor body 202 in a closed position, such arrangement also serves to add structural rigidity to the visor body 202 when assembled. As shown in this embodiment, such female snap receptors 216 and male snap protrusions 220 may be integrally molded into the visor body 202 as a one-piece construction. Also, any other suitable mechanism for connecting a front body portion to a rear body portion could be used. In such a construction, or in any other suitable hollow visor body construction, the hollow space within the visor body 202 may be referred to as the visor body inner space 222.

Figure 1A:
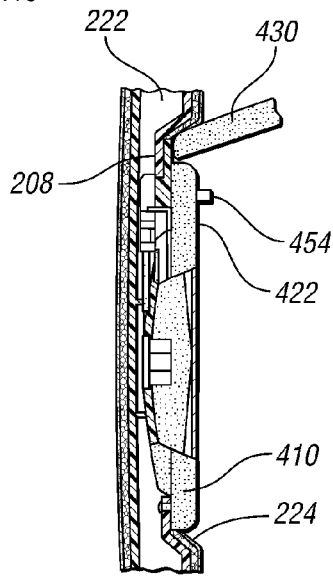
FIG. 1a is a partial section view of the visor taken along the line 1a-1a of FIG. 1.
Figure 3:
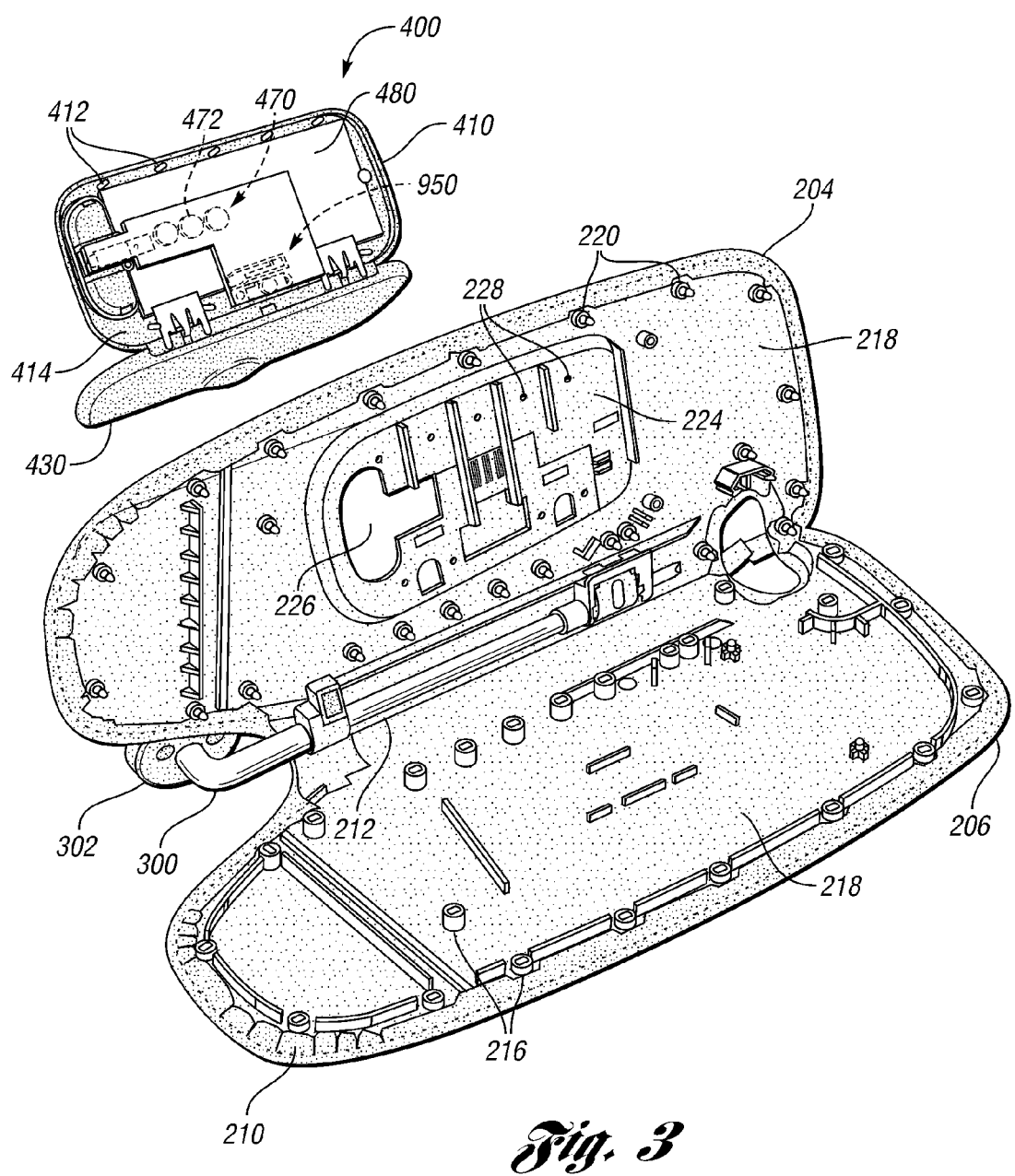
FIG. 3 is a perspective view of the rear of an assembled vanity mirror light assembly which could be used in accordance with the first embodiment of the present invention.

As shown in FIGS. 1, 1a, and 3, the front body portion 204 may include a body recess 224 and one or more body apertures 226 which can be of any suitable size and configuration and which are in communication with the visor body inner space 222 such that the vanity mirror light assembly 400 to be housed within the visor body 202 may be utilized. As shown in FIGS. 1 and 1a, in this embodiment the body recess 224 is dimensioned to receive the vanity mirror/light assembly 400 in an aesthetically pleasing manner.

Figure 4:
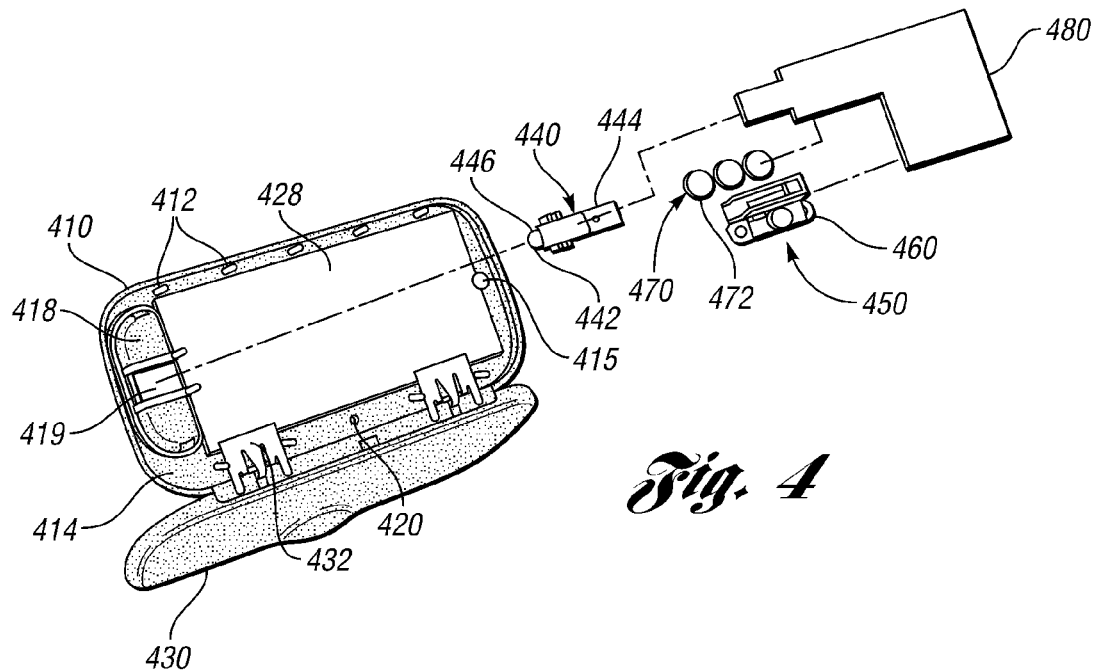
FIG. 4 is an exploded view showing a first embodiment of the vanity mirror light assembly of FIG. 3.

More specifically, in the embodiment shown in FIGS. 3 and 4, the vanity mirror/light assembly includes a bezel 410 having heat stake protrusions 412 located along the bezel interior surface 414 while the front body portion 204 of the visor body 202 includes heat stake apertures 228. During assembly of the visor assembly 100 of this embodiment, and before the front body portion 204 is folded over and connected to the rear body portion 206 of the visor body 202, the complete mirror/light assembly 400 is placed within the body recess 224 such that the heat stake protrusions 412 are inserted into and through the heat stake apertures 228. Then the heat staking process takes place during which the ends of the heat stake protrusions 412 are deformed such that the vanity mirror/light assembly is locked into place within the body recess 224 of the front body portion 204 of the visor body 202.

As shown in FIG. 1, the bezel 410 of the vanity mirror/light assembly 400 may have a mirror opening 416 of any suitable configuration. As shown in FIGS. 1 and 4, a mirror 428 may be mounted to the bezel interior surface 414 in any suitable manner such that the reflective surface 429 of the mirror 428 is exposed at the mirror opening 416 of the bezel 410 and available for use by a user of the vanity/mirror light assembly 400. The mirror 428 may attached to the bezel 410 in any suitable manner. Such attachment methods are known in the art. In the embodiment shown, the mirror 428 is mounted to the bezel interior surface 414 by heat staking 415.

As shown in FIG. 4, the bezel 410 of this embodiment also includes a bezel light recess 418 and bezel light recess aperture 419. A light source assembly 440 including a light source 442 and light source mount 444 may be positioned upon assembly such that the light source 442 is located within the light recess 418. The light source 442 can be any desired light source, such as a light emitting diode (LED), a liquid crystal display (LCD), or incandescent light bulb. In the case of an incandescent bulb, or wherever else desired, the light source mount could include a socket such that the light source 442 could be removed and replaced if desired. LEDs are preferred because they use less energy, thereby extending the useful life of the independent energy source, such as a battery. In the embodiments shown in FIGS. 1 and 4, one LED bulb 446 has been used. However, any number of bulbs having any desired characteristics may be utilized.

In the embodiments shown in FIGS. 1, 4, 6a, and 6b, the bulb 446 is operatively mounted within the light source mount 444 which may have electrodes such that it can be operatively connected to the electrical circuit 482. The light source mounts 444 maybe mounted such that the light source 442 is positioned within the light recess 418 in any suitable manner. For example, as shown in the embodiment of FIGS. 1 and 4, the light source mount 444 may be mounted to the circuit board 480 in any suitable manner, such as by heat staking, snaps, or soldering for example. The latter might be especially appropriate if the light source mount 444 had electrical leads which could be operatively soldered into the circuit 482 of the circuit board 480. As another alternative, the leads to the light source 442 could be operatively soldered into the circuit 482 of the circuit board 480 without using any light source mount. Such mountings are well known in the art and will not be discussed in further detail here. Further, the light source may be operatively located and mounted in any other suitable location in any suitable manner, including by heat staking, soldering, or otherwise, such as to or within the vanity body, vanity bezel, or circuit board. Such mountings are well known in the art and will not be discussed in further detail here.

A lens 490 may be provided for diffusing the light from the light source 442 and can be attached to the visor body 202 or vanity bezel 410 in any suitable or desired manner. In the embodiment shown in FIGS. 1 and 4, the lens 490 is designed so as to be snap fitted within a light/lens opening of the bezel 410 so as to cover the underlying light source 442. Because such snap fittings or other suitable attachment methods are well known in the art, they will not be discussed in further detail here.

The cover 430 may be connected to the bezel 410 in any suitable manner such that the cover 430 may be moved from a covering to an uncovering position and vice versa. In the embodiment shown, the cover 430 is connected to the bezel 410 by way of a cam and spring hinge 432 arrangement such that the cover 430 will tend to remain in a fully covering or fully uncovering position. Such arrangements are well known in the art and will not be described in further detail here. Furthermore, while the cover 430 in these embodiments is shown to be hingeably connected to the bezel, such a cover could be hingeably connected to the visor body 202 as well. While the cover 430 is shown in these embodiments as being hingeably mounted, such a cover 430 could also be mounted so as to move in a sliding, pivoting, or any other suitable manner so as to cover and uncover the mirror as desired.

The energy source 470 of this invention is independent of the vehicle's electrical system. The energy source 470 can be any desired independent source of energy, such as one or more batteries 472. In such case, any appropriate number and capacity of batteries could be used. In the embodiment shown in FIGS. 1 and 4, the energy source 470 may comprise three 1.5V batteries in series. Any suitable batteries may be used, such as lithium type batteries. As shown in this embodiment, the batteries 472 may be attached to the circuit board 480. Such attachment can be made in any suitable manner, such as by using standard mounts for such batteries, such as battery mount clips having electrodes such that they can be operatively connected to the electric circuit 482 (e.g., see FIGS. 6*a* and 6*b*). Such attachment mechanisms are well known in the art and will not be discussed in further detail here. Note that while the energy source 470 of this embodiment is shown to be mounted to the circuit board 480, the energy source may be mounted in any suitable manner and location, such as to or within the vanity assembly, including the vanity body 202 or vanity bezel 410. For example, while not shown, the energy source could be mounted within a compartment of the vanity or visor body, with such compartment having a removable covering such that the batteries or other such independent energy source 470 could be replaced when desired.

Figure 5:
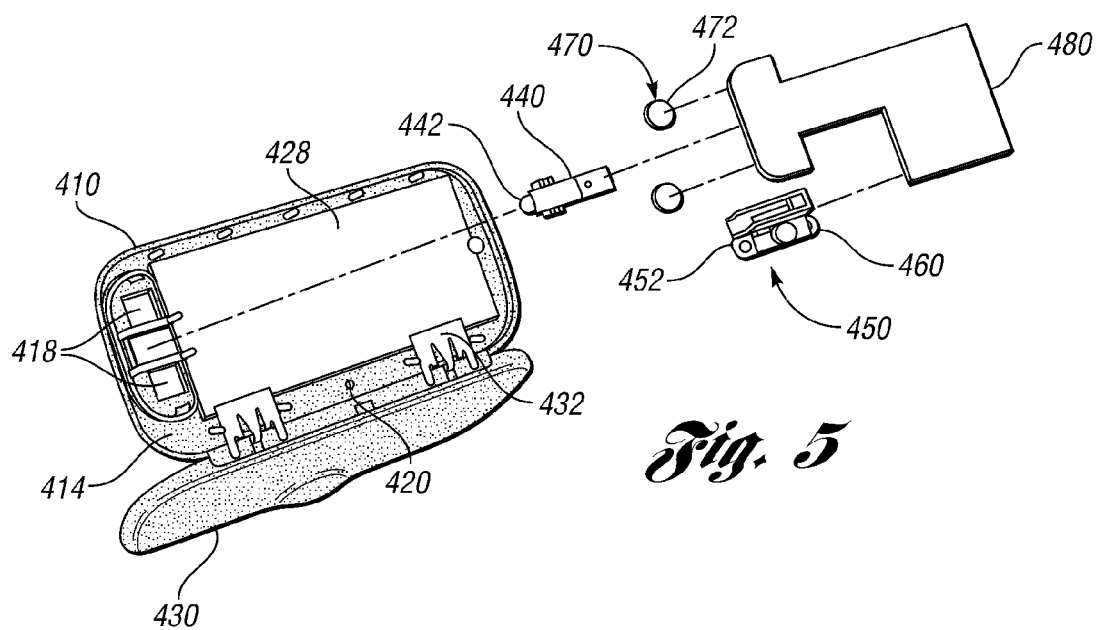
FIG. 5 is an exploded view showing an alternative embodiment of the vanity mirror light assembly to that shown in FIG. 3.

Alternatively, the energy source could be mounted within a compartment of the bezel, with such compartment having a removable covering such that the batteries or other such independent energy source 470 could be removed and replaced when desired. One possible embodiment of such an arrangement is shown in FIGS. 1 and 5, which show the use of two batteries 472 attached to the circuit board 480 such that when the vanity mirror/light assembly 400 is assembled, the batteries 472 are located within the bezel recess 418 on either side of the light source 442 under the lens 490. Such attachment of the batteries 472 to the circuit board 480 can be made in any suitable manner, such as by using standard mounts for such batteries, such as battery mount clips having electrodes such that they can be operatively connected to the electric circuit 482 (e.g., see FIGS. 6*a* and 6*b*). Such attachment mechanisms are well known in the art and will not be discussed in further detail here. In this embodiment, the lens 490 can be attached to the vanity bezel 410 in any suitable or desired manner such that it is removable so that the batteries can be removed and replaced when desired. For example, in the embodiment shown in FIGS. 1 and 5, the lens 490 may be designed so as to be snap fitted within the light/lens opening 424 of the bezel 410 so as to cover the underlying light source 442 and batteries 472. This would allow the light source 442 as well as the batteries 472 to be replaced when desired. Because such snap fittings or other suitable attachment methods are well known in the art, they will not be discussed in further detail here.

In any of the embodiments, the switch 450 can have any desired configuration or can be of any desired mechanism, so long as it serves to close the circuit when the cover 430 is in an open position, such that the light source 442 is energized, and to open the circuit when the cover 430 is in a closed position, such that the light source 442 is de-energized. Any such switch used may include electrodes such that it can be operatively connected to the electrical circuit 482 (e.g., see FIGS. 6*a* and 6*b*). In the embodiment shown, the light switch 450 is a plunger switch 452 having a plunger 454 which extends through a plunger aperture 420 of the bezel 410 and beyond the bezel front face 422 such that it will be plunged or released when the cover 430 is closed or opened respectively. In the event the cover 430 is mounted so as to slide or pivot as opposed to being hinged, alternative switch arrangements, which are known in the art, may be used. In fact, even in the event the cover is hingeably connected, switches other than a plunger switch 452 may be utilized. The switch 450 may be mounted to the visor body 202, the bezel 410, the circuit board 480, or on any other suitable location and by any suitable method. The plunger switch 452 may be attached in the appropriate location to the bezel 410 by heat staking or through any other suitable mounting method. In the embodiment shown in FIG. 4, the bezel 410 is mounted to the circuit board 480 such that when the circuit board 480 is assembled with the bezel 410, the plunger switch 452 is in the appropriate location such that the plunger 454 extends through the plunger aperture 420 of the bezel 410. In such case, any suitable mounting method may be used. Because such mounting methods are well known in the art, they will not be discussed in further detail here.

The visor assembly 100 also includes a timer 460 which serves to de-energize the light source 442 after a certain time period. Such timer may have electrodes such that it can be operatively connected to the electrical circuit 482 (e.g., see FIGS. 6*a* and 6*b*). More specifically, for example, if the cover 430 is inadvertently left in an open position, the light source 442 will be de-energized after a predetermined amount of time so as to conserve or reduce usage of the energy source 470. This prevents the energy source 470, such as batteries, from being inadvertently depleted. Such a timer 460 would reset if the switch 450 were again activated by the closing and opening of the cover 430 or otherwise. The timer 460 could be a separate component interconnected with the electrical circuit 482 so as to provide the desired affect. While any suitable timer 460 could be used, the timer 460 could also be incorporated as a component of the switch 450. For example, a plunger switch 452 incorporating a timer 460 would be suitable. Such a timer could be operatively mounted to the visor body 202, the bezel 410, the circuit board 480, or on any other suitable location and by any suitable mounting method. For example, the leads of such a timer 460 could be operatively soldered into the circuit 482 of the circuit board 480. Because such mounting methods are well known in the art, they will not be discussed in further detail here.

Figure 6A:
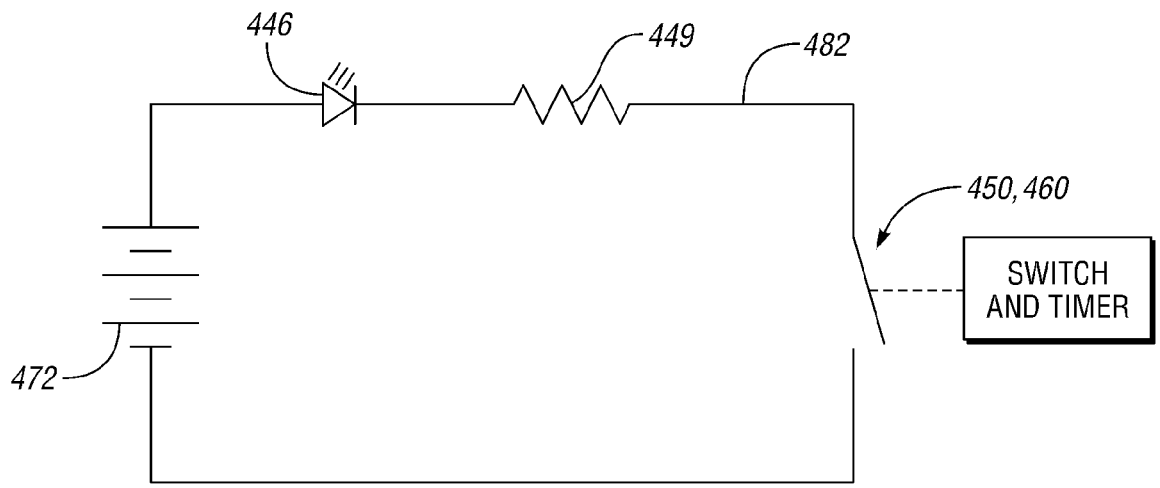
FIG. 6a is a schematic of an example embodiment of a circuit in accordance with the invention.
Figure 6B:
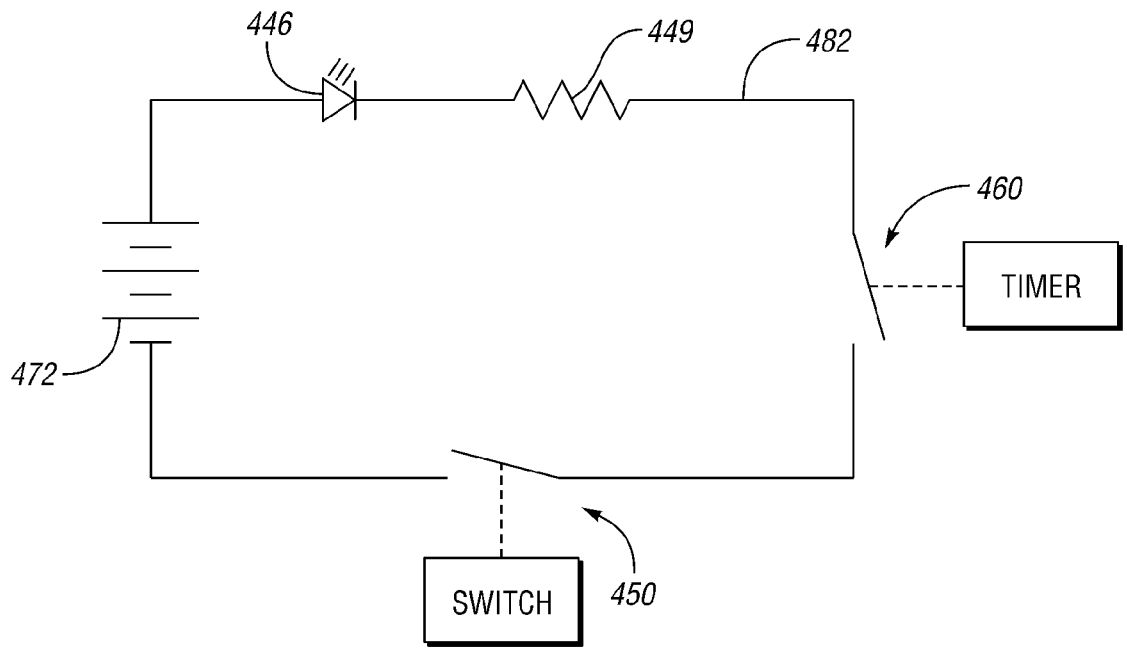
FIG. 6b is a schematic of an example alternative embodiment of a circuit in accordance with the invention.

The circuit board 480 may be of any suitable configuration and may include any desired electrical components and an electrical circuit 482 (e.g., see FIGS. 6*a* and 6*b*). Any circuit 482 may be configured to include the energy source 470, switch 450, timer 460, and light source 442 (e.g., LED 446) such that, when the cover 430 is opened and the switch 450 is closed, the light source 442 will be energized; such that when the cover 430 is closed and the switch 450 is opened, the light source 442 will be de-energized; and such that, if the cover 430 is opened for a certain period of time the timer 460 will operate to de-energize the light source, thereby conserving the life of both the energy source 470 and the light source 442.

Furthermore, while not shown in these embodiments, the visor assembly 100 could include a switch operated by the user of the vanity mirror instead of the cover 430. Alternatively, the visor assembly 100 could include a user switch such that if it were desired to energize the light source 442 for a length of time beyond that of the timer 460, the user could engage such a user switch to do so. Such switch alternatives could be operatively part of the electric circuit 482 and any such user switches could be located at the bezel front face 422.

Figure 2:
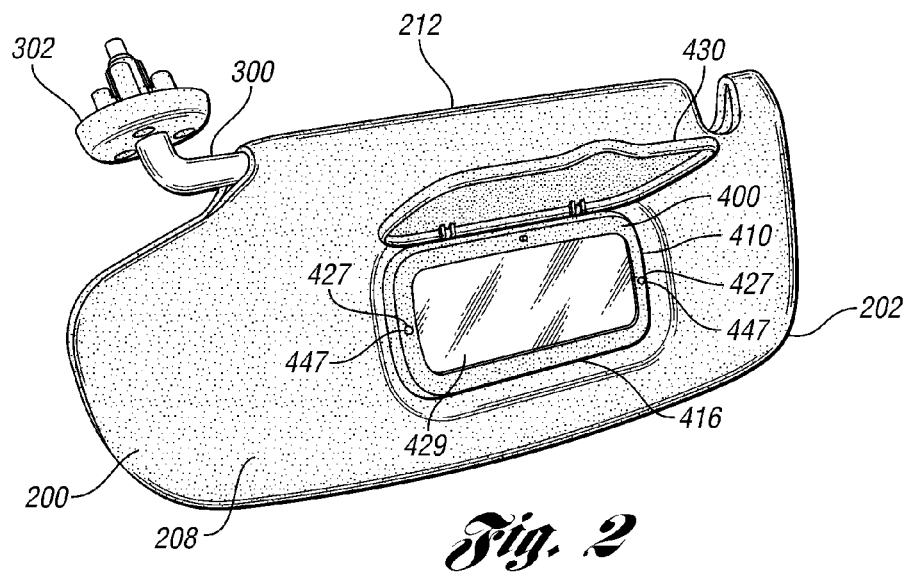
FIG. 2 is a perspective view of a visor assembly in accordance with a second embodiment of the invention.

FIG. 2 discloses another one of many possible alternative embodiments of the invention. In this embodiment as shown, in lieu of a light source assembly 440 underlying a lens 490 within a bezel light recess 418, the bezel includes LED openings 427 through which two LEDs 447 protrude. No lens is required. The LEDs may be mounted to the circuit board or to the bezel in any suitable manner. Of course, and light source other than LEDs could also be used. In the event LEDs are used, any appropriate LEDs may be used. Two 3 mm yellowish white LED bulbs having a forward voltage between 2.8 and 4.0V may be suitable. However, any number of bulbs having any desired characteristics may be utilized.

FIG. 6*a* is a simplified schematic of one of many possible circuits 482 which may be used when the timer 460 is incorporated as a component of the switch 450 such as described above. The circuit could include other components as desired. The switch could be a cover activated switch, a user activated switch, or otherwise. Other elements of the circuit 482 in this sample embodiment are the LED 446, a resistor 449, and the battery energy source 472. FIG. 6*b* shows a simplified schematic of an alternative possible circuit 482 with a timer 460 in the form of a switch being a separate component from the light switch 450. Again, the light switch could be a cover activated switch, a user activated switch, or otherwise.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A visor vanity for a vehicle having an electrical system, the visor vanity comprising:
   a visor body, the visor body including:
      a vanity mirror;
      a light source;
      an energy source independent of the electrical system of the vehicle for energizing the light source;
      a switch for causing the light source to be energized by the energy source; and
      a timer powered by the energy source and configured to cause the light source to be de-energized after a period of time has passed;
   wherein the visor body includes a removable lens overlying the light source and the energy source such that the energy source is capable of being accessed and replaced by removing the removable lens.

2. The visor vanity of claim 1 wherein the visor body includes a mirror cover for covering or uncovering the vanity mirror.

3. The visor vanity of claim 2 wherein movement of the mirror cover into the uncovering position causes the switch to energize the light source.

4. The visor vanity of claim 3 wherein movement of the mirror cover into the covering position causes the switch to discontinue energizing the light source.

5. The visor vanity of claim 4 wherein the mirror cover is a sliding cover.

6. The visor vanity of claim 4 wherein the mirror cover is a hinged cover.

7. The visor vanity of claim 1 wherein the switch discontinues to energize the light source after a predetermined amount of time has passed.

8. The visor vanity of claim 1 wherein the light source is an LED.

9. The visor vanity of claim 8 including a lens overlying the light source.

10. The visor vanity of claim 1 wherein the energy source is accessible such that it may be removed and replaced when necessary.

11. The visor vanity of claim 1 wherein the visor body includes a removable lens overlying the light source and the energy source.

12. The visor vanity of claim 1 further comprising a user switch positioned about the vanity mirror and operably coupled to the energy source for energizing the light source for an additional period of time.

13. A visor vanity for a vehicle having an electrical system, the visor vanity comprising:
   a visor body, the visor body including:
      a vanity mirror;
      a light source;
      a battery energy source independent of the electrical system of the vehicle for energizing the light source;
      a switch for causing the light source to be energized by the energy source;
      a timer powered by the energy source and configured to cause the light source to be de-energized after a period of time has passed; and
      a mirror cover for covering or uncovering the vanity mirror and cooperating with the switch such that movement of the mirror cover into the uncovering position causes the switch to energize the light source and movement of the mirror cover into the covering position causes the switch to discontinue energizing the light source;
   wherein the visor body includes a removable lens overlying the battery energy source such that the battery energy source is accessed and replaced by removing the removable lens.

14. The visor vanity of claim 13 wherein the light source is an LED.

15. The visor vanity of claim 13 further comprising a user switch positioned about the vanity mirror and operably coupled to the energy source for energizing the light source for an additional period of time.

16. A visor vanity for a vehicle having a electrical system, the visor vanity comprising:
   a visor body having a vanity mirror/light assembly, the vanity mirror/light assembly including:
      a bezel;
      a vanity mirror having a reflective surface, the vanity mirror being mounted to the bezel such that the reflective surface may be used by a user of the visor vanity;
      a light source mounted to the bezel;
      a battery energy source for energizing the light source, such battery energy source being independent of the electrical system of the vehicle;
      a switch for allowing or disallowing the energy source to energize the light source;
      a mirror cover mounted to the bezel for covering or uncovering the vanity mirror, wherein movement of the mirror cover into the uncovering position causes the switch to energize the light source; and
      a removable lens overlaying the battery energy source such that the battery energy source is capable of being accessed and removed by removing the removable lens.

17. The visor vanity of claim 16 further comprising a circuit board for mounting at least one of the light source, the battery energy source, and the switch thereon.

18. The visor vanity of claim 17 wherein the bezel includes a bezel light recess positioned about the removable lens and adjacent to the light source and wherein the circuit board includes a first portion for mounting the battery energy source thereon such that the first portion of the circuit board is extended into the bezel light recess to facilitate access and removal of the battery energy source upon removing the removable lens.

* * * * *